April 14, 1959 W. AITKENHEAD 2,881,845

HARROW

Filed Dec. 2, 1953 10 Sheets-Sheet 1

Inventor
William Aitkenhead
by [signature]
Attorney

April 14, 1959 W. AITKENHEAD 2,881,845

HARROW

Filed Dec. 2, 1953 10 Sheets-Sheet 2

Inventor
William Aitkenhead
by [signature]
Attorney

April 14, 1959 W. AITKENHEAD 2,881,845

HARROW

Filed Dec. 2, 1953 10 Sheets-Sheet 3

Inventor
William Aitkenhead
by [signature]
Attorney

April 14, 1959 W. AITKENHEAD 2,881,845

HARROW

Filed Dec. 2, 1953 10 Sheets-Sheet 4

Inventor
William Aitkenhead
by [signature]
Attorney

Inventor
William Aitkenhead
by [signature]
Attorney

April 14, 1959 W. AITKENHEAD 2,881,845

HARROW

Filed Dec. 2, 1953 10 Sheets-Sheet 6

Inventor
William Aitkenhead
by [signature]
Attorney

April 14, 1959 W. AITKENHEAD 2,881,845

HARROW

Filed Dec. 2, 1953 10 Sheets-Sheet 7

Inventor
William Aitkenhead
by [signature]
Attorney

Inventor
William Aitkenhead
by [signature]
Attorney

Inventor
William Aitkenhead
by [signature]
Attorney

April 14, 1959 W. AITKENHEAD 2,881,845

HARROW

Filed Dec. 2, 1953 10 Sheets-Sheet 10

Inventor
William Aitkenhead
by [signature]
Attorney 2,881,845

HARROW

William Aitkenhead, Lees, Oldham, England

Application December 2, 1953, Serial No. 395,688

15 Claims. (Cl. 172—447)

Figure 1:
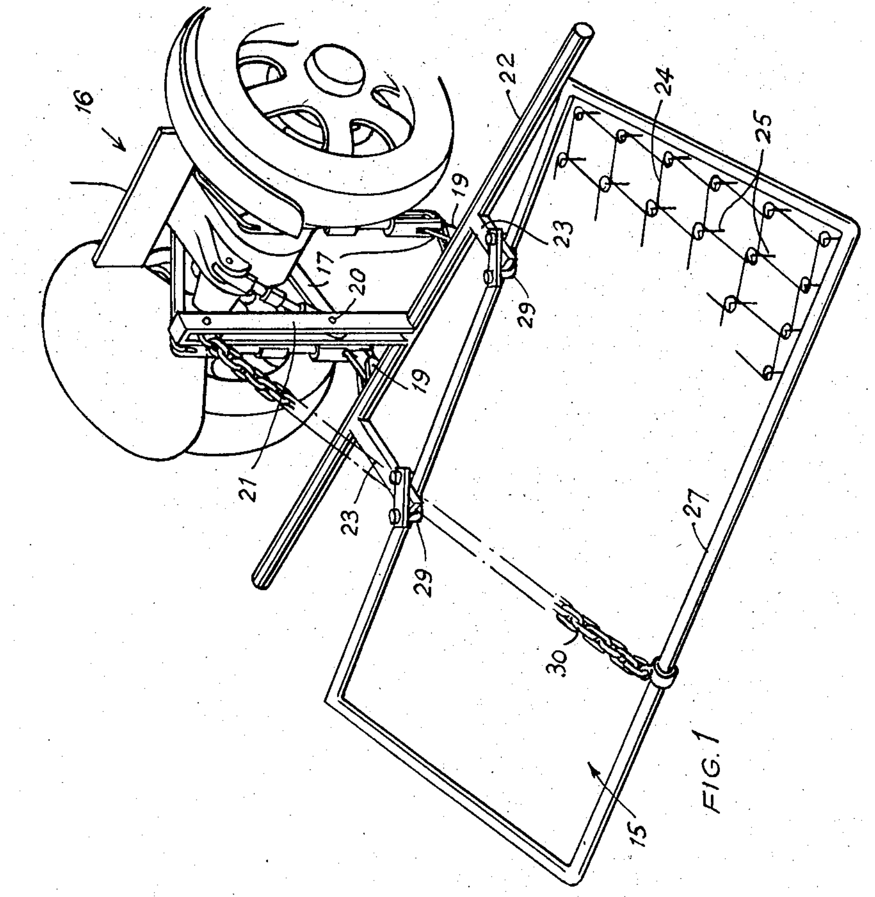

This invention relates to harrows, and is more particularly concerned with that type of harrow which comprises a plurality of similar link elements connected together so as to form a flexible, usually rectangular mat, each element being provided with one or more tines, projections or blades for cutting, rubbing or scraping the surface to be treated.

Owing to the necessarily symmetrical arrangement of the link elements in a flexible harrow of this type, the ground-engaging parts (hereinafter referred to for convenience simply as tines) form a regular pattern of several tines wide and several transverse rows in depth, so that, when the harrow is pulled along, corresponding tines in the various rows, or in alternate rows, will cut the same track.

This tendency to "tracking" cannot be avoided simply by staggering the tines in successive rows as is done in "zig-zag" or draw harrows, the effect of such offsetting in the case of a flexible harrow being speedily neutralized by the lateral self-adjustment of the rearward rows of tines which inevitably occurs under working conditions when the front edge of the flexible mat aforesaid is maintained at right angles to the line of draught.

If, however, a whippletree or equivalent member to which the front row of link elements is connected be so attached to the towing point that the mat is suitably skewed with reference to the draught-line, all the lateral flexibility of the harrow can be absorbed and the tines in each row maintained offset with reference to those in the row or rows ahead.

The amount of skew necessary to eliminate "tracking" of the tines depends upon the type of ground being harrowed and the resultant pressure upon such tines, and for this reason the connections between the whippletree or its equivalent and the towing point are usually arranged in such a manner that the angle of skew of the harrow is readily adjustable.

When any type of harrow is towed behind a tractor, it is desirable to be able to lift the tines clear of the ground to facilitate the periodical cleaning thereof and removal of collected weeds and rubbish, as well as to reduce the width of headland required when the tractor is being turned with the implement behind it and to permit the conveyance of the harrow along a road (or through a gateway) while mounted upon a tractor.

The object of the present invention is an improved construction of flexible harrow which, without any substantial reduction of its vertical flexibility in use, is capable of being raised or lowered by the normal power-lift equipment of a tractor and can also, if desired, be towed in a skewed condition.

Furthermore, the arrangement of parts hereinafter described enables a very quick adjustment of the angle of skew to suit different conditions of working, and also permits the harrow to be inverted or reversed end-for-end if desired.

According to this invention a flexible harrow is marginally embraced by, and anchored within, a closed rigid frame whose front part is attachable at laterally spaced positions to a tractor-mounted drawbar, a rearward part or parts of said frame being adapted for suspension from a tractor-mounted member elevated above said drawbar and the whole arrangement being such that the harrow can be angularly adjusted (or skewed) about an axis perpendicular to the normal plane thereof and passing, as nearly as possible, through such harrow's centre of pressure and the longitudinal centre-line of the tractor.

The expression "tractor-mounted," as used above and hereinafter, is intended to denote that the members in question are adapted for connection to, and collective operation by, the laterally rigid linkage of normal tractor power-lift equipment.

Furthermore, the term "tractor" should be understood to include, not only the normal form of vehicle with implement-attachment means at the rear, but any kind of self-propelled structure to which implements can be connected.

If desired, a multiple harrow may be produced by hingedly connecting side-by-side the frames of two or more of the harrow units aforesaid, the several units being attached to the drawbar either collectively or individually so that they can be skewed with reference to the centre of pressure of the whole harrow (which lies substantially on the longitudinally centre-line of the tractor) or with reference to their individual centres of pressure, as that case may be, and their mode of suspension from the elevated member aforesaid being such that the several units are normally maintained in a common plane while capable of relative folding movement to reduce their overall width.

The harrow (or each unit thereof) may be laterally positioned by means of marginal attachments to the frame or, when such attachments are of a flexible nature so as not to restrict vertical flexibility of the tine-carrying mat, other parts of the latter may be connected to the frame (or to corresponding parts of an adjacent unit) by some other form of lateral stabilizer.

Figure 2:
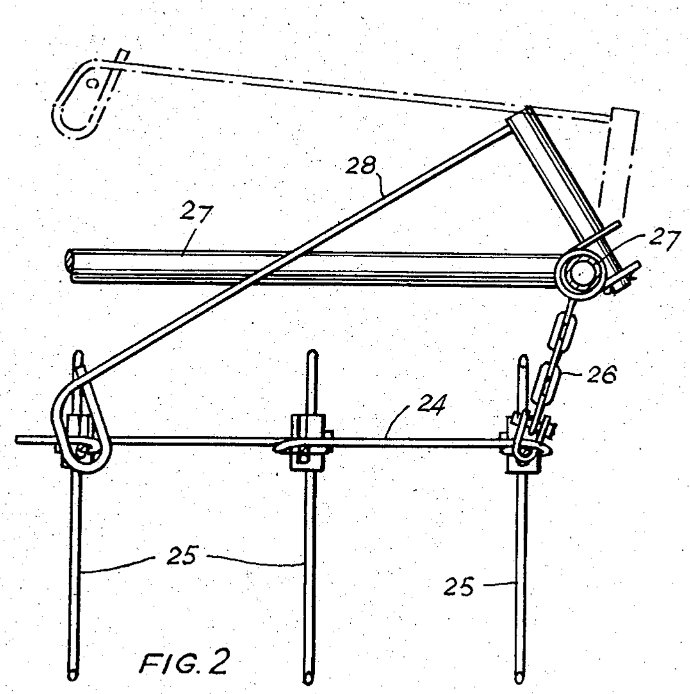
Figure 3:
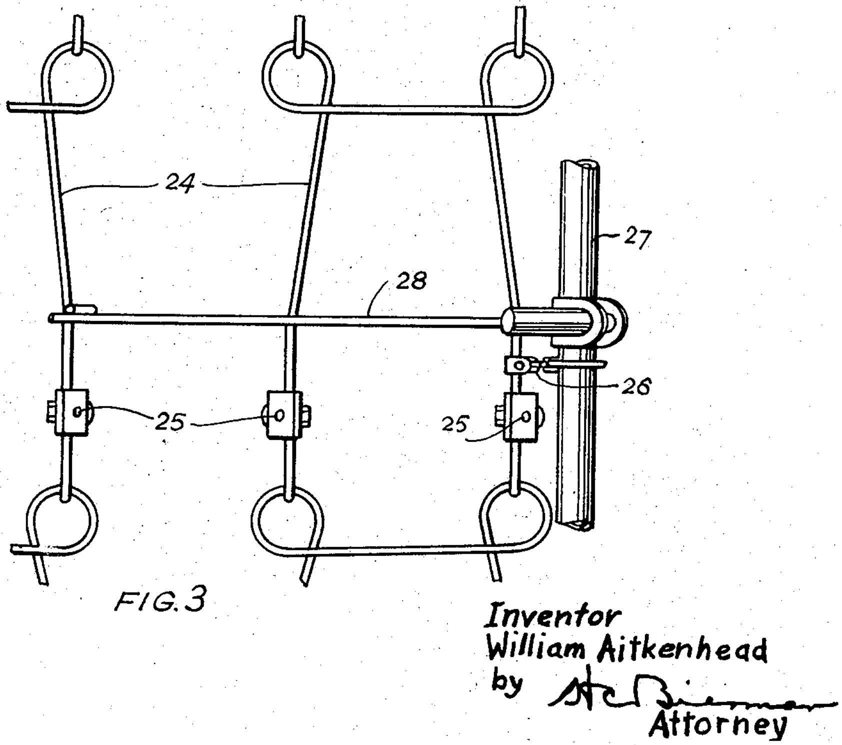
Figure 4:
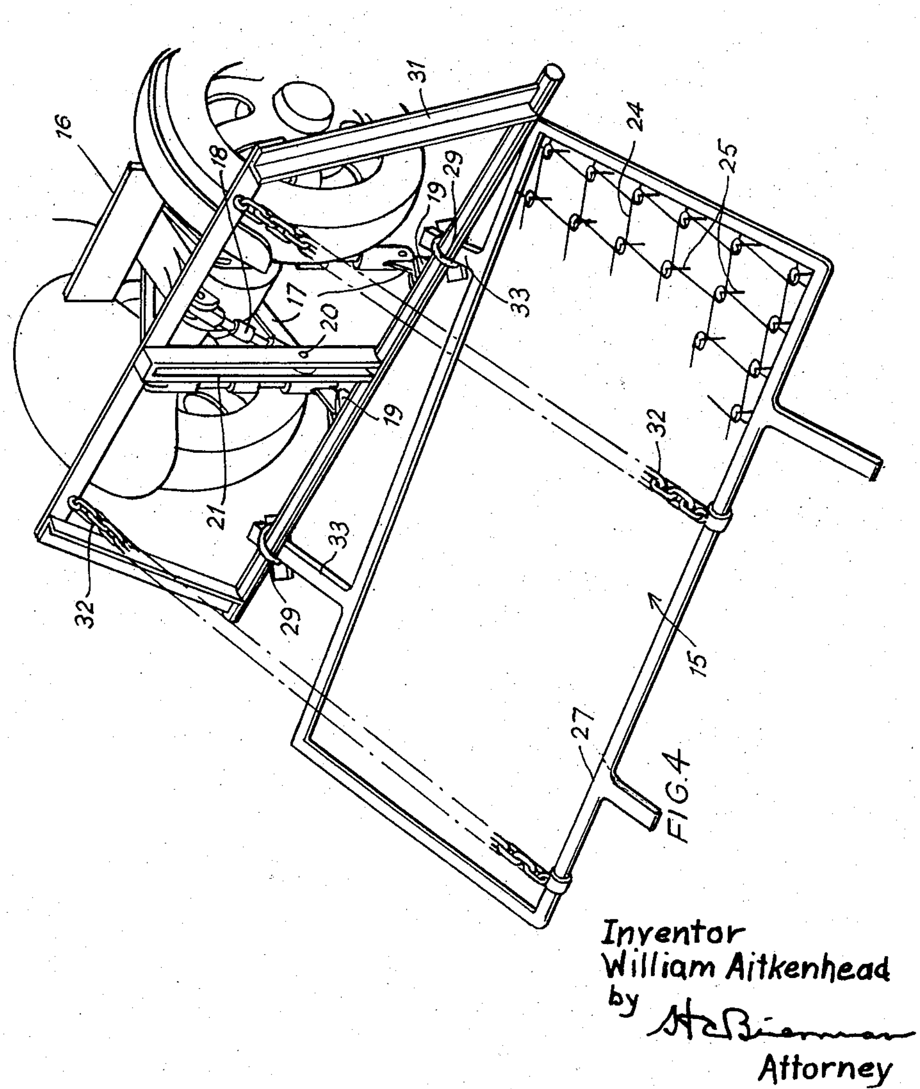
Figure 5:
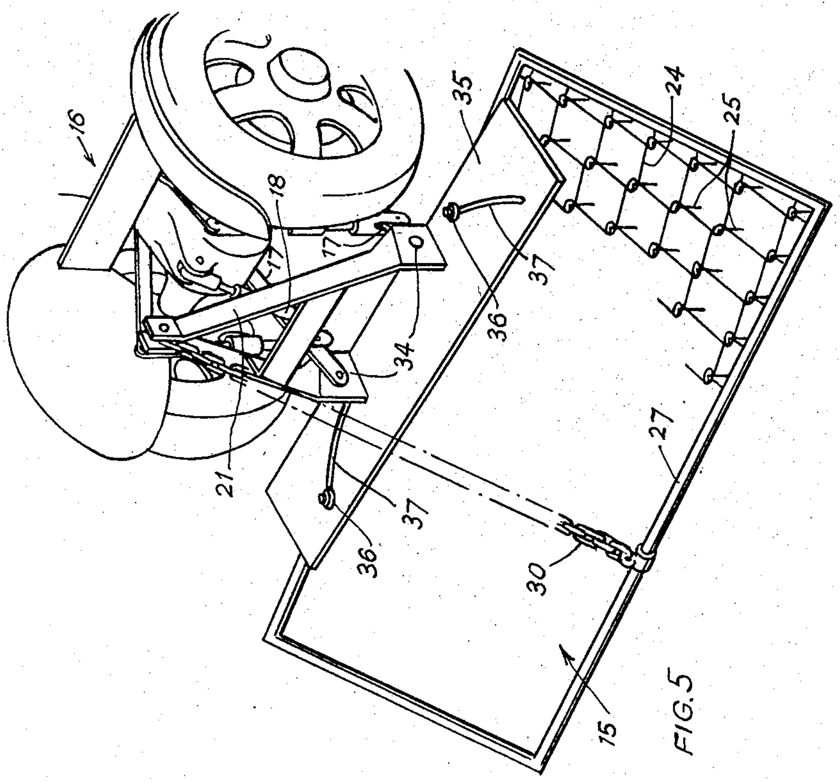
Figure 6:
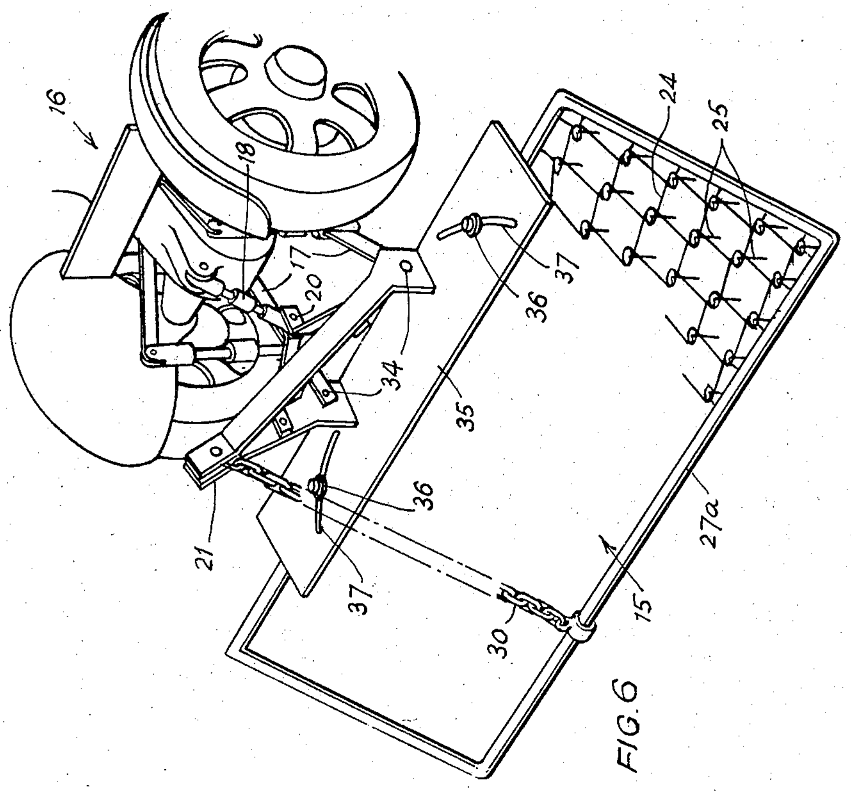
Figure 7:
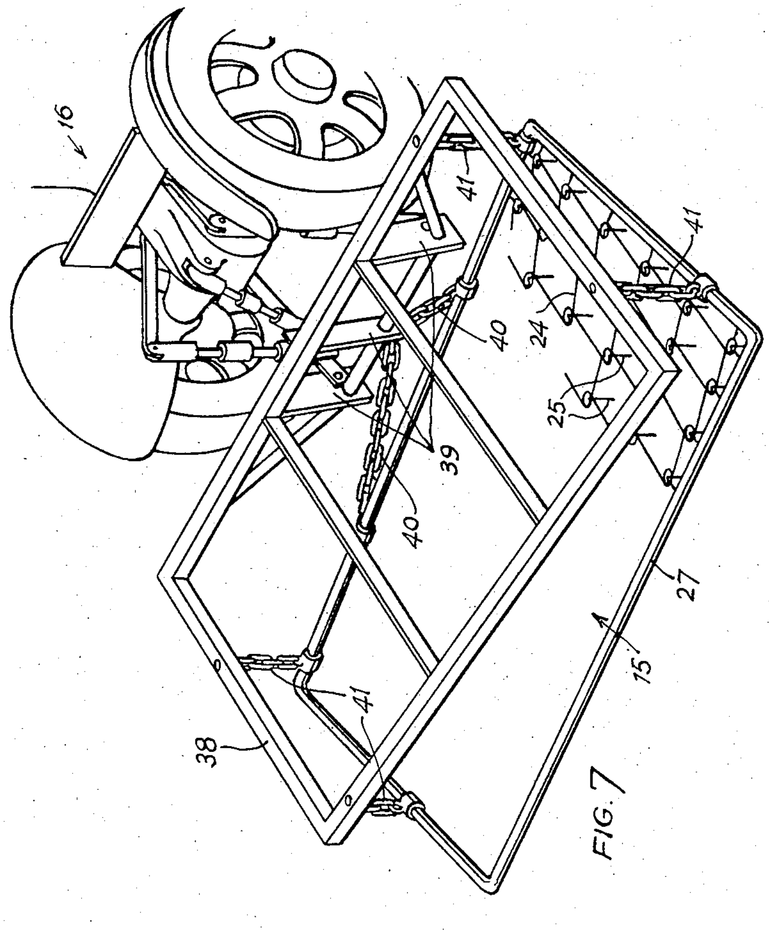
Figure 8:
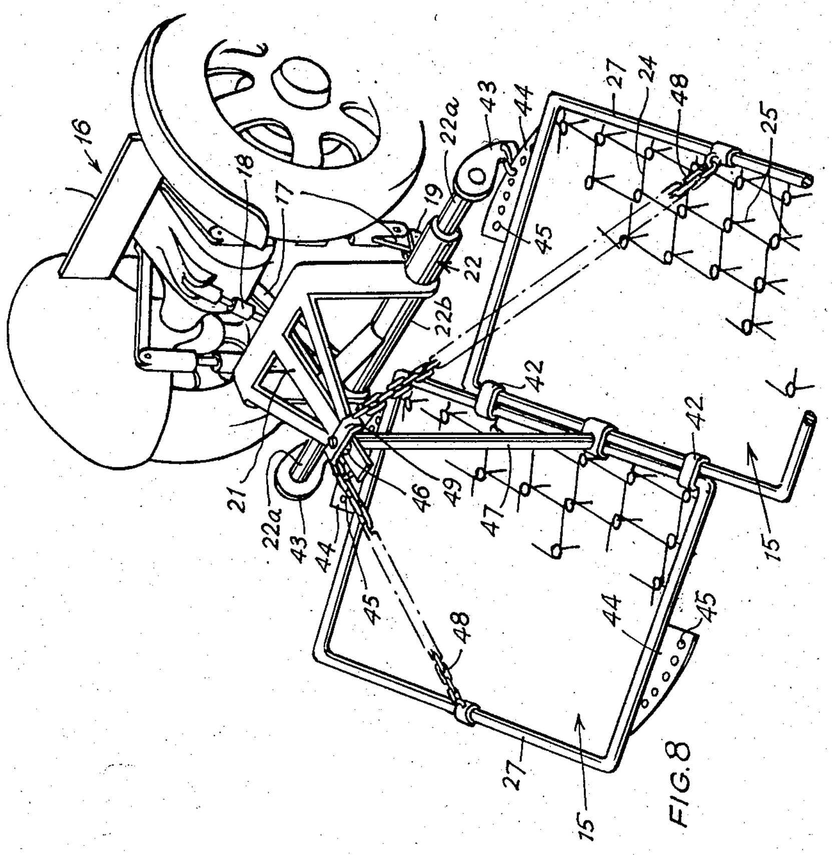
Figure 9:
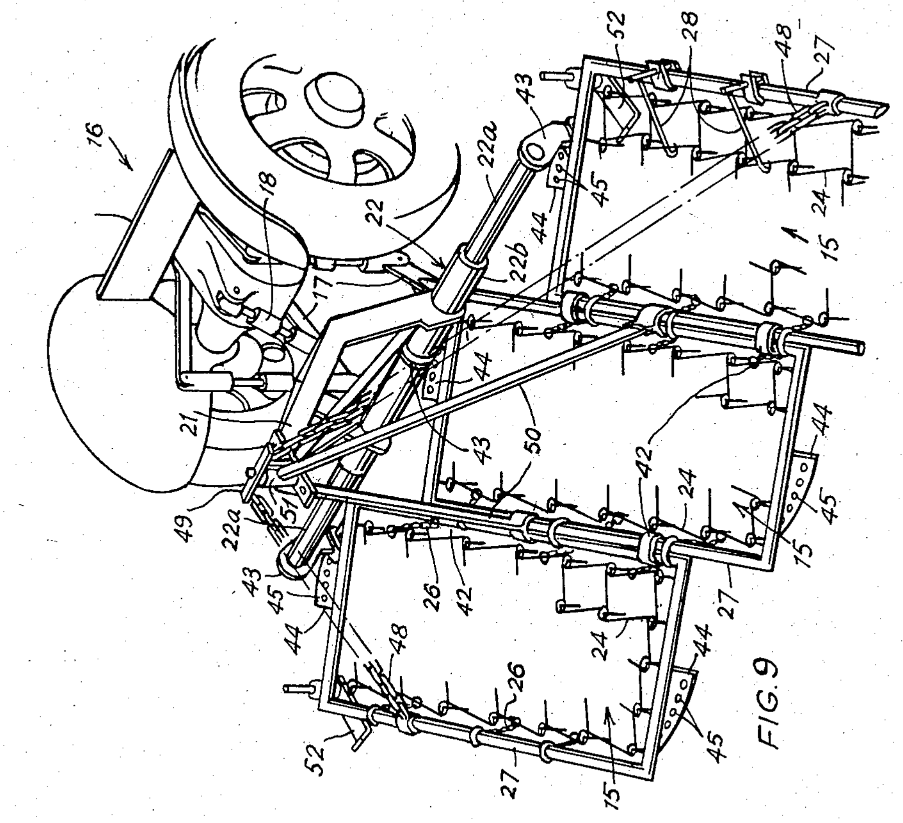
Figure 10:
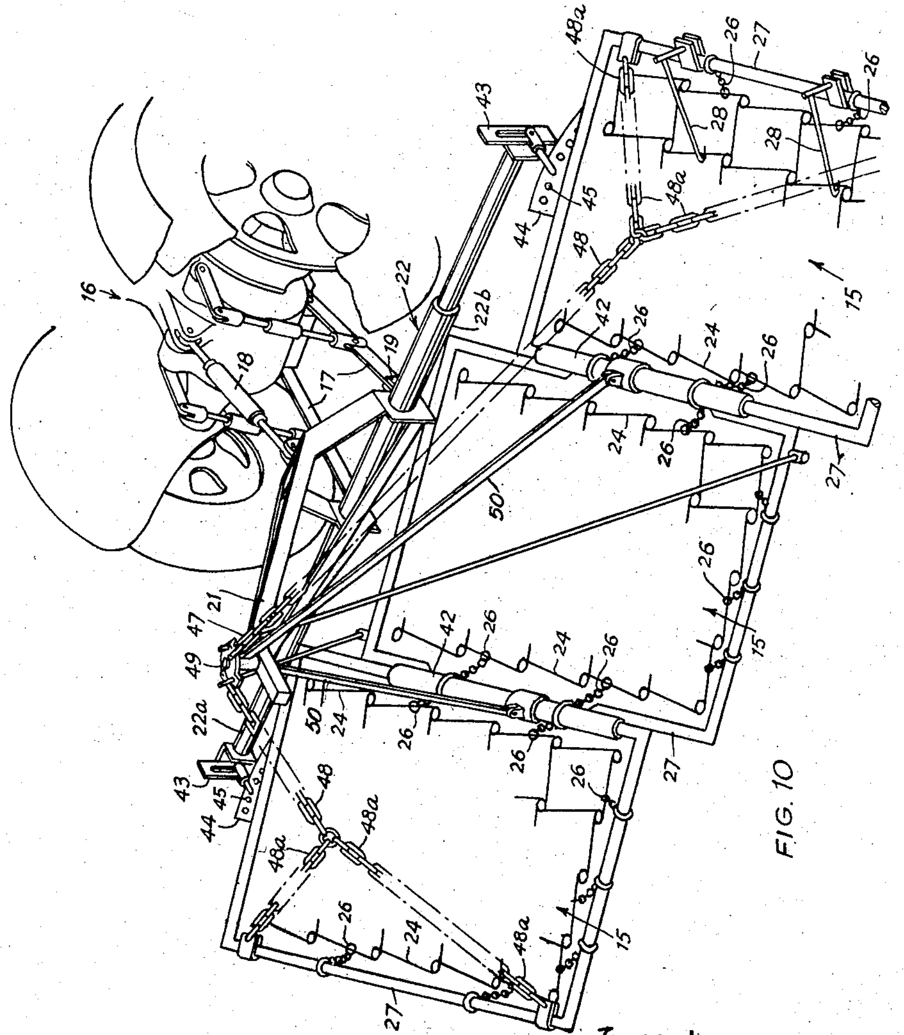
Figure 11:
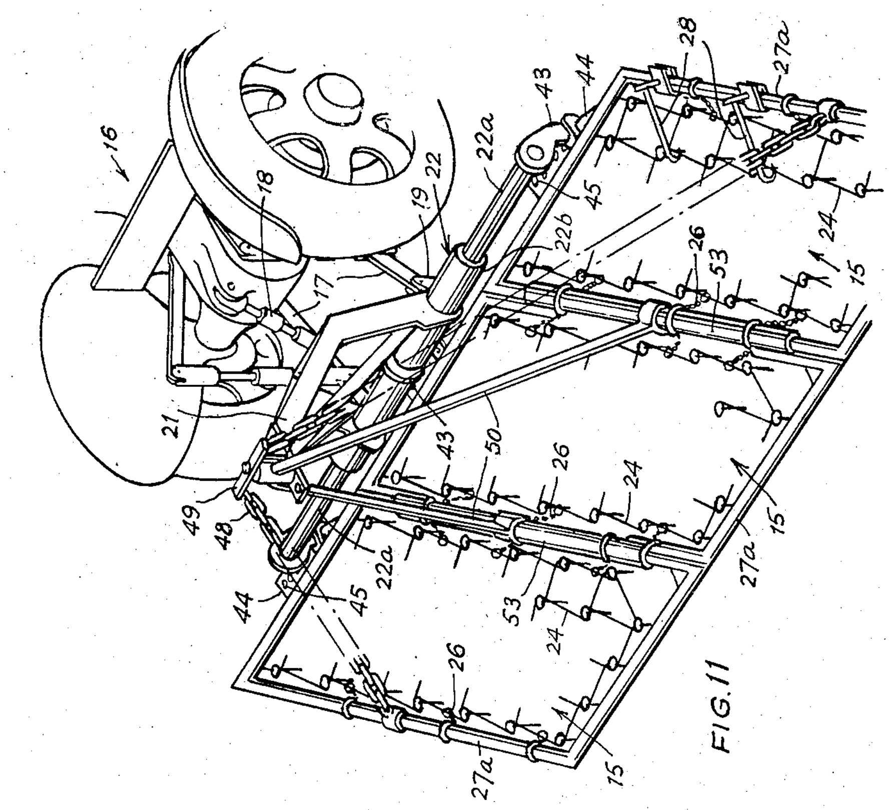

In the accompanying drawings:

Fig. 1 is a perspective view showing one example of the improved harrow mounted upon a tractor, Figs. 2 and 3 are a side elevation and plan view, respectively, of one form of lateral stabilizer for the tine-carrying mat, drawn to an enlarged scale as compared with Fig. 1, Fig. 4 is a perspective view corresponding to Fig. 1 and showing an alternative construction of a single-unit harrow, Fig. 5 is a perspective view of another modification of a single-unit harrow, Fig. 6 is a perspective view of a further modification of a single-unit harrow, Fig. 7 is a perspective view of a still further modification of a single-unit harrow, Fig. 8 is a perspective view of a multiple harrow having two hingedly-connected units, Fig. 9 is a perspective view of a multiple harrow having three hingedly-connected units, Fig. 10 is a view similar to Fig. 9 showing a modified form having three hingedly-connected units, and Fig. 11 is a view similar to Fig. 9 showing a further modified form having three hingedly-connected units.

In the example illustrated in Fig. 1, the improved flexible harrow 15 is designed for haulage by a motor tractor 16 on which implements are mountable through the medium of a known form of three-link hitch comprising two laterally spaced hydraulically-operated links 17 and a third link 18 disposed midway between the other two but at a higher level.

Links 17 have their free ends articulated at 19 to draw bar 22. Link 18 is articulated at 20 to headstock 21 which is upstanding from, and rigidly united to, a transverse drawbar 22. The pivotal connections at 19, 20 are arranged, in known manner, so that the upper link 18 lies substantially parallel to the plane containing the lower links 17.

The drawbar 22 has rigidly mounted thereon two laterally spaced, rearwardly directed arms 23, whose distance apart may be predetermined to suit the width of harrow to be towed.

Such harrow comprises a flexible rectangular mat 24 built up, in known manner, of inter-engaged link elements provided (at least at their undersides) with integral or other tines 25, the marginal elements of such mat being attached by short chains 26 (see Figs. 2 and 3) to the adjacent parts of a tubular or other rectangular frame 27 of somewhat greater length and width than the mat 24, so that the whole (or any portion) of the latter has a limited freedom of vertical movement with reference to such frame.

The lateral stability of the flexible mat 24 with reference to its frame 27 may be ensured by anchoring suitable parts thereof directly to the free ends of arms 28 pivoted upon the sides of such frame (as shown in Figs. 2 and 3) and extending inwards at right angles to its length. Alternatively, vertically-guided sliding members or other forms of linkage may be used, although usually this will not be necessary so long as the line of draught passes through the centre of pressure (approximately the geometrical centre) of the flexible mat 24.

In order that the harrow 15 may be towed in the skewed condition as shown, the front part of its frame 27 is secured to the two arms 23 by clamps 29 at difference distances from the drawbar 22, or alternatively plates or lugs on the frame 27 may be bolted or shackled to the arms 23 to obtain the same effect. Obviously the arms 23 may be arranged further apart than illustrated and connected to the frame 27 at or near the corners of the latter.

Since it will usually only be desired to skew the harrow 15 in one direction, one of the arms 23 may be exceedingly short, or even dispensed with entirely (in which case the harrow frame 27 is connected directly to the drawbar 22), and the second arm may have a plurality of holes therein for selective engagement by the bolt or shackle, when this method of attachment is used, the plate or lug on the adjacent part of the frame having a series of bolt- or shackle-receiving holes (or a slot) therein to allow of variation in the angular relation of the frame 27 to the drawbar 22.

The harrow 15, when attached to the drawbar 22 as aforesaid, is maintained substantially parallel with the ground by means of a chain 30 or adjustable stay which connects the rearward part of its frame 27 to the top of the headstock 21 or to a rearwardly inclined upward extension thereof. In the latter case, the free end of the headstock extension may be disposed more or less directly above the centre of pressure of the harrow 15 in the various angular positions of the latter.

In the modified construction shown in Fig. 4, the headstock 21 forms the central member of a trapezoidal or other framework 31 upstanding from and rigidly united with, the drawbar 22, the upper part of such structure being connected to the rear of the harrow frame 27 by means of laterally spaced chains 32 or adjustable stays which are symmetrically arranged with reference to the harrow's centre of pressure.

Obviously, if desired, the framework 31 may be replaced by two posts or davits arranged at opposite sides of the headstock 21 and having the chains 32 or adjustable stays connected thereto.

It will be noted that, in Fig. 4, the attachment arms 23 are omitted from the drawbar 22, which instead is secured by the clamps 29 or other means to forward extensions 33 from the harrow frame 27, and obviously such an arrangement may be substituted for the one shown in Fig. 1. Said extension 33 permits lateral adjustment of frame 27 relative to drawbar 22.

In the further modification of Fig. 5, the headstock 21 is of A shape, the lower traction links 17 being articulated at 34 to the limbs thereof adjacent their junctions with a flat horizontal plate 35 which replaces the drawbar 22 of the preceding constructions.

The front of the harrow frame is attached to the plate 35 by means of laterally spaced bolts 36, the bolt-holes in the plate 35 being formed as arcuate slots 37 to allow of the harrow 15 being skewed at any desired angle.

Obviously, if desired, a slotted plate corresponding to 35 may be united to the drawbar 22 of Figs. 1 and 4 and the harrow frame 27 secured thereto in the manner just described.

Fig. 6 shows an arrangement similar to that of Fig. 5, except that in this case the A-shaped headstock 21 is rearwardly inclined in the manner of a davit, so that the upper anchorage of the suspension chain 30 (or equivalent stay) is brought substantially directly about the centre of pressure of the harrow 15.

Fig. 7 differs from the preceding constructions inasmuch as the headstock 21 (or its equivalent or equivalents) is or are placed by a framework 38 which extends rearwardly above, and approximately parallel to the plane of, the harrow frame 27, the traction links 17, 18, being articulated to brackets 39 depending from such framework. The front of the harrow frame 27 is coupled by adjustable draught chains 40 or stays to one of the brackets 39, a drawbar carried by the latter, or a perforated quadrant plate on such drawbar. The other parts of the frame 27 are suspended by chains 41 or stays from the overhead framework 38.

It will be appreciated that the constructions above described enable the harrow 15 to be raised and lowered, as a unit with its frame 27, by means of the tractor's power-lift equipment acting through the headstock 21 and drawbar 22, or the equivalents of these members.

Provision may be made for quickly detaching the harrow frame 27 from the tractor-mounted parts, so that it may be used inverted when desired. For example, the single-time harrow 15 shown in Figs. 1 and 4 to 7 (having tines 24 at one side only) may be used on its back as an ordinary chain harrow, or a harrow of the double-tine type shown in Figs. 2 and 3 (with upper and lower tines of different length) may be used with either side up as may be required for treatment of arable land or pasture.

Alternatively, when inclined tines are provided and there are suitable attachment means at the rearward part of the frame 27, the harrow 15 may be turned end-for-end before re-attachment to the tractor 16.

In a case where the link elements of the flexible mat 24 have the tines 25 asymmetrically arranged (Figs. 1, 4, 5 and 7) so that those in consecutive rows are mutually staggered, it will be appreciated that the use of an embracing rigid frame 27 as above described effectively prevents the lateral creep of the rear tines which would eventually produce "tracking" in a freely-trailing harrow, and thus a harrow with "built-in" stagger of the tines may, when anchored in accordance with the present invention within a rhomboidal frame 27*a*, be towed in a straight-ahead position as shown in Fig. 6 (i.e. with the front part of the frame at right angles to the line of draught).

Fig. 8 shows a multiple harrow comprising two framed rectangular units 15 similar to those shown in Figs. 1, 4, 5 and 7, the inner sides of the frames 27 being hingedly connected at 42 in such a way that the two units 15 may be adjusted longitudinally of one another when it is desired to tow them in the skewed condition illustrated.

The tractor-mounted structure in this case consists of a rearwardly cranked or curved davit-like headstock 21 mounted upon a drawbar 22 whose end portions 22*a* may be telescopically slidable within the tubular central portion 22*b* which carries the headstock 21, so that the overall length of the drawbar may be adjusted as desired. Alternatively the end portions of the drawbar may be foldable.

Each end portion of the drawbar 22 carries a dependant arm 43 to which a quadrant plate 44 on the front part of the adjacent harrow frame 27 is attached by a bolt or shackle, such plate being duplicated at the rearward part of the frame 27 to allow of the two harrow units being turned end-for-end with reference to the tractor 16. Each of the bolts or shackles aforesaid is passed through a curved slot, or a curved row of spaced holes 45, in the adjacent quadrant plate 44, so that the harrow units 15 can be skewed through any angle with reference to the draught-line of the tractor and fixed in that position.

The upper end of the headstock 21 has a vertical bush 46 whose extended axis passes approximately through the centre of pressure of the whole harrow, and in this bush is rotatably mounted a king-pin 47 whereby the hingedly connected parts of the two frames 27 are suspended, the free sides of such frames being suspended by chains 48 from a yoke 49 carried by the king-pin 47.

Should it be desired at any time to reduce the overall width of such a multiple harrow during transit to or from the land under treatment, the hinged mounting of the units 15 permits of their being folded upwards and inwards against the headstock 21 after disconnection from the drawbar end sections 22*a* which are then slid or folded inwards. The harrow may, if desired, be folded as aforesaid without re-setting the skewed units 15 to a straight-ahead position, it being understood, of course, that the whole assembly is subsequently raised by means of the power-lift equipment.

Fig. 9 shows a multiple harrow consisting of three units 15, the inner sides of the outer frames 27 being hinged at 42 to the adjacent sides of the middle frame so that they can be folded upwards and inwards in the manner just described.

The front part of the middle frame 27 is attached to a third arm 43 on the central section 22*b* of the drawbar, and the hingedly connected parts of the several frames are suspended from the limbs of an inverted V-shaped stay 50 whose apex is rotatable upon a vertical pin 51 mounted in the upper end of the headstock directly above the overall centre of pressure of the harrow. This pin 51 also carries the yoke 49 from which the suspension chains 48 are led to the free sides of the outer frames 27. These chains may be supplemented as shown by adjustable skids 52 or side wheels.

As shown in Fig. 10, the suspension chains 48, instead of being lead to the outer frames 27 at points equidistant from the drawbar 22, may have their lower parts branched, as at 48*a*, and connected to the front and rear corners of the said frames.

Fig. 11 resembles Fig. 9 except insofar as the three harrow units 15 are constructed with "built-in" stagger of the tines and rhomboidal frames 27*a*, an arrangement which enables the front parts of such frames to be placed parallel to the drawbar 22.

A further difference lies in the fact that each side part of the central frame is constituted wholly or partly by a tubular member 53 which embraces the adjacent part of one of the foldable outer frames.

It will be noted that a line joining the points of attachment of the chains 48 to the outer harrow frames in Figs. 8, 9 and 11 passes approximately through the centres of pressure of the several units 15, the four points of attachment of the subsidiary chains 48*a* in Fig. 10 being symmetrically arranged with reference to such a line.

Substantial vertical play may be allowed in the hinge connections between the several units 15 to ensure an adequate overall flexibility of the whole assembly, and it will be understood that, whilst the suspension chains 48 define the lowermost horizontal positions of the units to which they are attached, they permit of their hinging upwards with reference to the tractor-mounted structure or middle unit 15 (if any) so that their tines will not bite too deeply should they encounter an eminence outside the wheel-track of the tractor 16.

The stabilizing arms 28 previously mentioned as pivoted upon the frames 27 and connected to suitable parts of the flexible mats 24 may be replaced by vertically-guided sliding members or by other forms of linkage.

I claim:

1. A flexible harrow marginally embraced by, and anchored within, a closed rigid frame, a transverse drawbar mounted on a tractor, the front of said frame being attachable to said drawbar at laterally spaced positions, a headstock mounted on said tractor, means at the rear of said frame for attachment thereof to said headstock above said drawbar, tines constituting said harrow suspended in said frame, connecting means between said frame and drawbar for angularly adjusting said frame about an axis substantially perpendicular to the normal plane of said frame, said axis passing substantially through the center of pressure of said harrow and the longitudinal center-line of said tractor.

2. A flexible harrow according to claim 1, further characterised in that the harrow is positioned by means of marginal attachments to said frame whereby the vertical flexibility of the tines is not impaired, other parts of the latter being connected to the frame whereby the body of the harrow is free to move up and down through the embracing frame.

3. A flexible harrow according to claim 1, further characterised in that the drawbar comprises a plate having arcuately slotted holes through which can be passed clamping bolts associated with the front of the harrow frame.

4. A flexible harrow for association with tractor-mounted structure as claimed in claim 1, the drawbar and headstock being collectively represented by a rigid framework extending rearwardly above, and approximately parallel to the plane of, the harrow frame, which latter is adapted both for towage and suspension from the said framework.

5. A flexible harrow according to claim 1 wherein said connecting means comprises a projecting arm mounted and rigidly united between said drawbar and said frame, and a second rigid arm laterally spaced from said first arm and united between said drawbar and said frame.

6. A flexible harrow according to claim 1 designed for application to a tractor whose power lift equipment comprises two laterally spaced power operated links and a third link disposed midway between said power operated links and at a higher level, the drawbar being articulated to the lower links and the elevated member taking the form of a headstock which upstands from said drawbar and is articulated to the upper link, the rearward part of said frame adapted for connection to said headstock by laterally spaced stays disposed at opposite sides of the center of pressure thereof.

7. A flexible harrow produced by hingedly and slidably connecting side by side the frames of at least two harrow units, each of said units comprising a series of depending tines flexibly suspended from and marginally embraced by a closed rigid frame, said units being attached to the drawbar and adaped to be skewed relative to the center of pressure thereof, said units being so suspended from a headstock that they are normally in a common plane so as to be capable of relative folding movement to reduce their overall width.

8. A flexible harrow according to claim 7 having at least three units and adapted for towage from a drawbar of detachable construction, slidable end portions of such drawbar being attachable to the foldable harrow units when the latter are in their operative positions, and its central portion being attachable to the central harrow unit.

9. A flexible harrow according to claim 7, further characterised in that the units are slidably mounted relative to each and are normally suspended from the headstock aforesaid by means of chains passing over their respective centres of pressure and connected to the outer parts of their frames.

10. A flexible harrow according to claim 7, further characterised in that the slidably connected parts of the harrow frames are suspended by at least one stay from the headstock aforesaid.

11. A flexible harrow produced by slidably connecting side by side the frames of at least two harrow units, each of said harrow units being marginally embraced by, and anchored within, a closed rigid frame, the front of said frame being attachable to a drawbar mounted on a tractor, tines constituting said harrow suspended in said frame, connecting means between said frame and drawbar for angularly adjusting said frame about an axis substantially perpendicular to the normal plane of said frame, said axis passing substantially through the center of pressure of said harrow and longitudinal centerline of said tractor, the several units being attached to the drawbar so that said units are adapted to be skewed relative to the center of pressure thereof, said units being so suspended that they are normally in a common plane, said units being interconnected so as to be capable of relative folding movement to reduce their overall width.

12. A flexible harrow according to claim 11 wherein the units are hingedly and slidably connected to one another.

13. A flexible harrow marginally embraced by, and anchored within, a closed rigid frame which is supported by stays from a vertical pivot directly above the center of pressure of the harrow tines, said pivot being pin mounted on a rearward extension of a combined headstock and drawbar at a point on the longitudinal center-line of the tractor to which said headstock and drawbar are attached.

14. A flexible harrow according to claim 13 wherein the drawbar is connected to a plate having arcuately arranged holes through which can be passed clamping bolts associated with the front of the harrow frame.

15. A flexible harrow according to claim 14 wherein the arcuately arranged holes are so positioned that the pitch thereof increases from one end of said plate to the other.

References Cited in the file of this patent

UNITED STATES PATENTS

| | | |
|---|---|---|
| 1,167,969 | Arbogast | Jan. 11, 1916 |
| 1,198,533 | Glerum | Sept. 19, 1916 |
| 1,341,159 | Tillmann | May 25, 1920 |
| 1,535,058 | Taylor | Apr. 21, 1925 |
| 1,653,292 | Kelly | Dec. 20, 1927 |
| 1,712,688 | Brown | May 14, 1929 |
| 1,757,865 | Jensen | May 6, 1930 |
| 1,786,194 | Dickinson | Dec. 23, 1930 |
| 2,336,152 | Rude | Dec. 7, 1943 |
| 2,498,888 | Hyland et al. | Feb. 28, 1950 |
| 2,591,028 | Udy | Apr. 1, 1952 |
| 2,687,073 | Thorp | Aug. 24, 1954 |

FOREIGN PATENTS

| | | |
|---|---|---|
| 554,033 | Great Britain | June 16, 1943 |
| 669,979 | Great Britain | Apr. 9, 1952 |
| 403,880 | Italy | May 11, 1943 |
| 223,890 | Switzerland | Feb. 1, 1943 |

OTHER REFERENCES

Farm Implement News of April 21, 1949, page 82, Har-O-Plane disclosure.